United States Patent [19]
Peacock

[11] 3,882,579
[45] May 13, 1975

[54] ANTI-WEAR THIN FILM COATINGS AND METHOD FOR MAKING SAME

[75] Inventor: Roy Norman Peacock, Lafayette, Colo.

[73] Assignee: Granville-Phillips Co., Boulder, Colo.

[22] Filed: Aug. 21, 1973

[21] Appl. No.: 389,644

Related U.S. Application Data

[62] Division of Ser. No. 234,162, March 13, 1972, abandoned.

[52] U.S. Cl............... 29/95 R; 29/95 D; 76/101 A; 82/1 C
[51] Int. Cl....... B26d 1/00; B23b 3/00; B21k 21/00
[58] Field of Search....... 29/95, 95 B, 95 D; 76/101, 76/101 A; 82/1, 1 C

[56] References Cited
UNITED STATES PATENTS

| | | | |
|---|---|---|---|
| 1,424,536 | 8/1927 | Wenger | 29/95 |
| 2,645,471 | 7/1953 | King | 29/95 X |
| 3,482,295 | 12/1969 | Trent | 29/95 |
| 3,564,683 | 2/1971 | Schedler et al. | 29/95 |
| 3,616,506 | 11/1971 | Ekemar | 29/95 |

*Primary Examiner*—Harrison L. Hinson
*Attorney, Agent, or Firm*—Gerald J. Ferguson, Jr.; Joseph J. Baker

[57] ABSTRACT

A tool for and the method of cutting metal containing materials, the tool including a coating on the cutting edge thereof and a method of providing the coating on the cutting edge including the steps of (1) cleaning the cutting edge; and (2) vapor depositing a coating material selected from the group consisting of titanium, chromium, hafnium, zirconium, alloys thereof with each other, and alloys thereof with other materials where the titanium, chromium, hafnium, or zirconium is at least 2 percent of said last-mentioned alloy, the coating material being deposited onto the cutting edge to a depth of approximately $10^{-2}$ to 10 $\mu$m.

14 Claims, 9 Drawing Figures

ANTI-WEAR THIN FILM COATINGS AND METHOD FOR MAKING SAME

Related Application

This application is a division of application Ser. No. 234,162 filed Mar. 13, 1972 now abandoned.

BACKGROUND OF THE INVENTION

1. FIELD OF THE INVENTION

This invention relates to tools having thin film, anti-wear coatings and the use thereof, the method of preparing the coatings, and the resulting composite structures. In particular, this invention relates to cutting methods where there are provided such coatings on the cutting surfaces of machine tool bits, drills, taps, etc., which may be comprised of high speed alloy steel or tungsten carbide and the like. The coatings will increase the life of the tool, permit operation of the machine at increased production rates, and yield improved surface finish of the work, as will be brought out in more detail hereinafter.

2. DISCUSSION OF THE PRIOR ART

Numerous prior art processes have been evolved to provide antiwear surfaces on cutting tools. Many of these processes using combinations of hard surfacing, heat treatments and chrome plating provide very useful improvements in wear life. However, these useful prior art processes are complex, or require complex equipment, or are uneconomical unless performed on a mass production basis. Thus, they are available only on the original cutting edge as purchased and are not ordinarily available for use on the resharpened cutting tool, and are in fact seldom used. After a cutting tool is resharpened only a relatively few simple processes or coatings are available to reduce wear where further heat treatment is not possible. None of these coatings provide the degree of improvement observed with the more complex commercially available coatings. The magnitude of the problem is evident when it is noted that approximately 70 percent of all cutting tools are of the type that are intended to be resharpened one or more times. The simple but relatively ineffective coatings fall into three categories:

1. Coatings of known lubricating materials such as $MoS_2$, $WS_2$ and $MoSe_2$ - These substances are lubricating because their basic crystal structure allows easy, directional shearing. Since they are soft they quickly wear away from the high friction region on a cutting tool, although they may have temporary value.

2. Coatings of soft metals which provide a lubrication mechanism such as gold, silver and indium - The mechanism of lubrication is a shearing of the soft metal, with some adhering to both surfaces. The bond of such metals to a tool is not very good, and when so used these coatings will either peel away or relatively quickly wear off.

3. Coatings of electro-plated chromium - Films of chromium in the thickness range of about $2.5 \times 10^{-1}$ to 1.25 $\mu$m are known to increase the life of tools such as taps. See "Metals Handbook," 8th Edition, Taylor Lyman, ed. (American Soc. for Metals, Metals Park, Ohio, 1964) Vol. 2, pp. 326 and 111. Chromium coatings have also been used for plug gauges and wood cutting saws, but apparently not on lathe bits. The coatings have been very brittle, and tend to peel from sharp corners. Also, the method of application by electroplating, leads to hydrogen embrittlement of the tool, weakening the base metal of the tool as brought out in the above reference. The process has never become an important commercial one for cutting tools because of the inconvenience of electroplating after each sharpening, which usually cannot be done by the user, and the problems of obtaining adequate bonding of the coating to the tool.

Chromium coatings on many things are primarily intended to prevent corrosion. This, for example, is one of the reasons for using thin sputtered chromium films on razor blades. Chromium coatings which are vapor deposited on razor blades are disclosed in U.S. Pat. No. 3,480,483 granted to A. Wilkinson. As will be brought out in more detail hereinafter, an important aspect of this invention is the provision of a coating on a tool for cutting metal containing material whereby the metal containing material does not adhere to the cutting edge so that useful tool life is substantially increased. Of course, there is no concern about such adhesion in a razor blade of the type disclosed in the Wilkinson patent.

The vapor deposition of a cadmium coating on steel parts such as those used in aircraft construction is disclosed in U.S. Pat. No. 2,890,135 granted to A. Jenkins. One of the reasons that the vapor deposition technique is used is to avoid hydrogen embrittlement. However, as brought out in more detail hereinafter, the use of the vapor deposition technique is but one aspect of applicant's invention.

3. DISCUSSION OF TOOL WEAR

Figure 1:
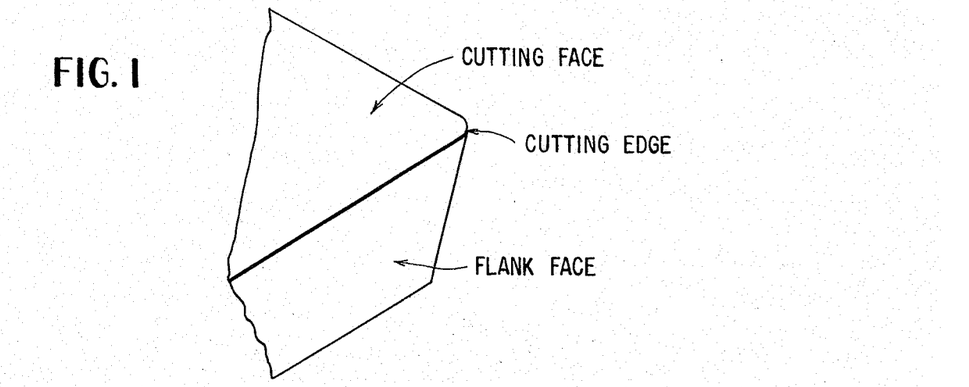
FIG. 1 is a diagrammatic illustration of the important surfaces of a tool insert.

A brief discussion of tool wear will aid in understanding the coatings of this invention. FIG. 1 identifies the terms used to designate the important surfaces of a tool insert.

Figure 2:
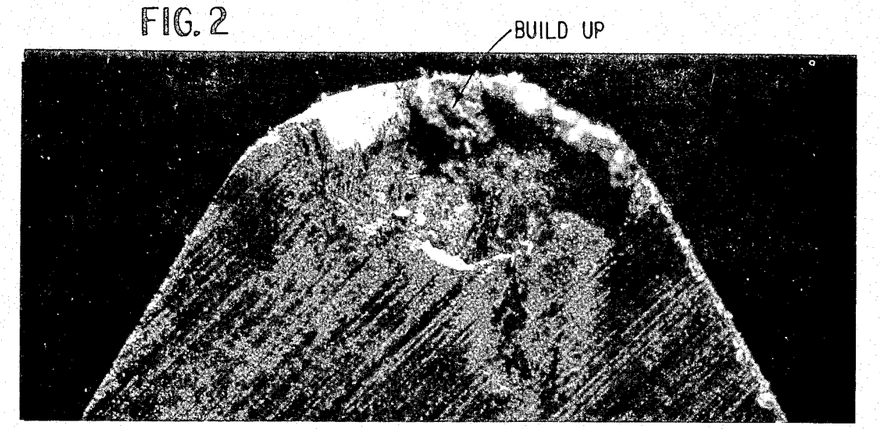
FIG. 2 is a photograph of build-up of 304 SS on a cemented carbide insert at the end of useful life, the build-up being shown in a pit on the insert.
Figure 3:
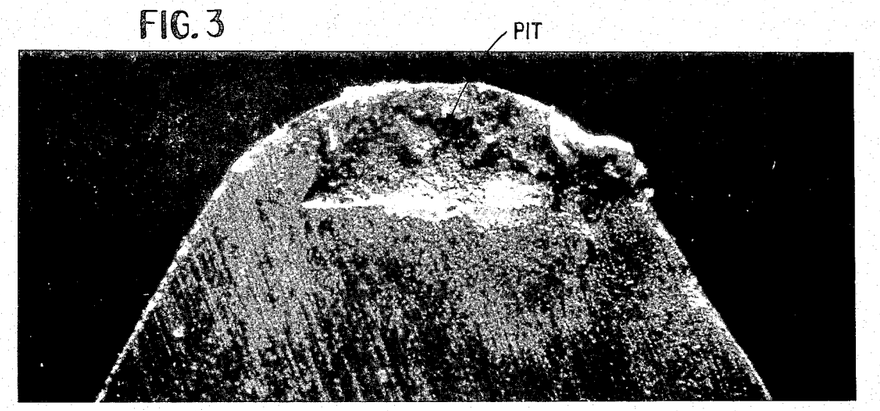
FIG. 3 is a photograph of another edge of the same insert where the build-up has been removed to make the pit more visible.
Figure 4:
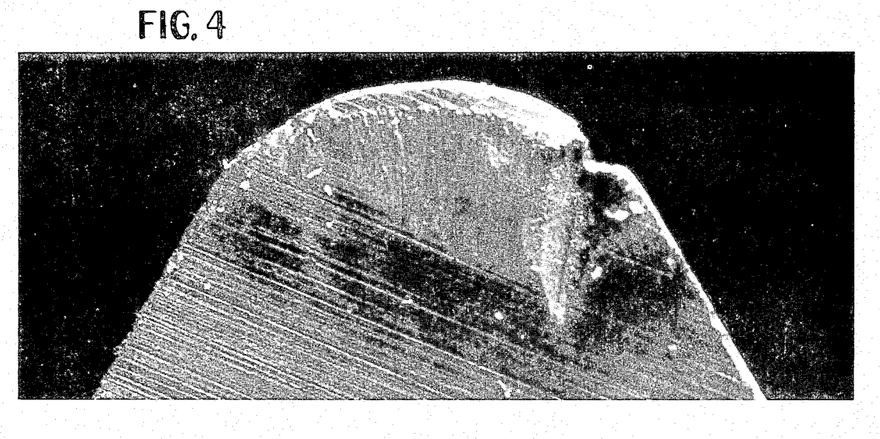
FIG. 4 is a photograph of an insert coated in accordance with this invention showing no pitting but only wear after long use.

Two distinctly different types of wear can be distinguished on a typical cutting tool used to cut ductile metals. The first type is a gradual and steady wearing away of the tool surfaces. Apparently such gradual wear is an abrasion process and occurs wherever metal flows continuously across the cutting tool surfaces. The process appears to proceed more or less uniformly with time and would by itself eventually produce a dulling of the sharp cutting edge. The second type is an abrupt or stepwise wear process that occurs whenever cut metal builds up on the cutting tool. Where metal build-up occurs the cutting surface is temporarily protected from abrasive wear. However, when the lump of built-up material is eventually torn away by the cutting forces, a discrete piece of the tool may be pulled away with it. The tool surface is now even rougher than before, fostering more rapid build-up and a repetition of the process. Soon the tearing out of tool material extends to the cutting edge and rapid tool failure results. FIG. 2 is a photograph of a built-up deposit resulting from the cutting of type 304 SS with a tungsten carbide insert. The deposit fills a cavity approximately flush with the insert surface. FIG. 3 shows another point on the same tungsten carbide insert with the build-up removed, and a visible pit remaining. For comparison, a tungsten carbide insert coated and used on the same job as the insert of FIGS. 2 and 3 is shown in FIG. 4 after making several times as many parts. It can be seen that there is no pitting, only wear after long use.

Figure 5:
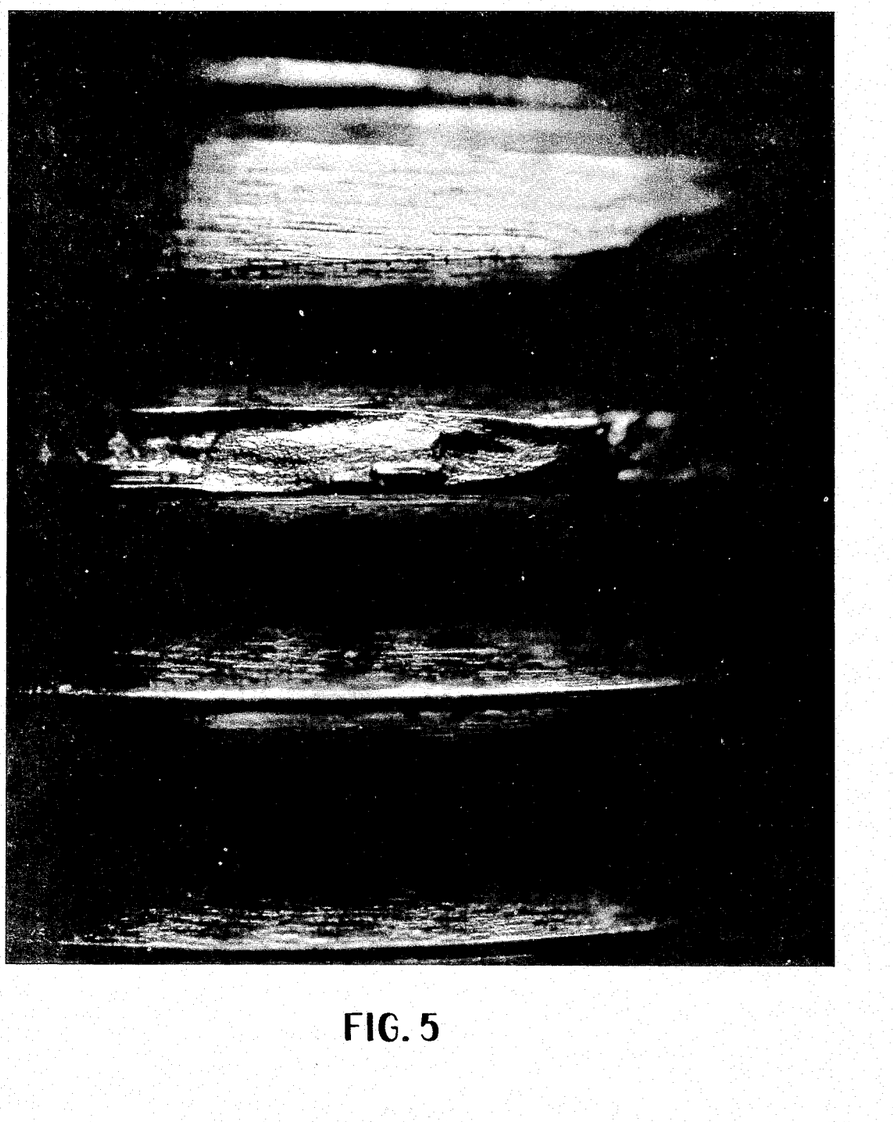
FIG. 5 is a photograph of the working end of an uncoated tap showing galling.
Figure 6:
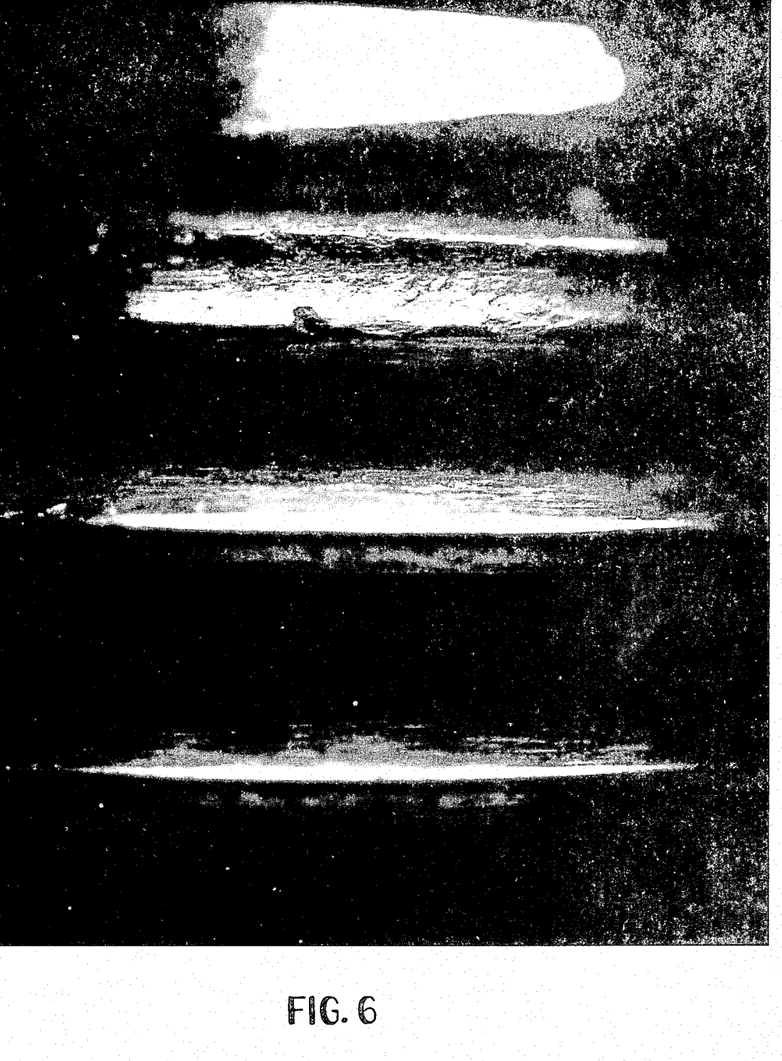
FIG. 6 is a photograph of the working end of a tap coated in accordance with this invention after use equivalent to that of the tap of FIG. 5.

Alloy high speed steel is much less brittle than tungsten carbide, reducing the importance of chipping due to build-up. However, metal to metal contact in the case of high speed steel tools such as taps, dies, and reamers leads to galling, or a smearing and tearing of the tool's surface which destroys its shape, makes the tool force increase, and tears the work. In extreme cases the tool may seize so that it cannot be removed. FIG. 5 shows a high speed, uncoated steel tap where the entering threads have been damaged by seizing and galling after tapping 387 holes. FIG. 6 shows a similar tap coated in accordance with this invention after use equivalent to that of the tap of FIG. 5 where wear of the tool surface is substantially less than that shown in FIG. 5.

What is required to solve the problem of tearing away of the metal is a coating which will prevent the metal from adhering to the tool surfaces. However, if the cut metal does not adhere to the tool then it follows that the cut metal will be moving with respect to the tool surface and abrading the coated surface. Thus lubricants such as $MoS_2$ may prevent metal build-up temporarily but are relatively rapidly abraded away as are coatings of soft metals such as gold, silver, and indium. Plating of high speed tool steels with chromium also has been used to prevent metal build-up. However, as noted in the before-mentioned "Metals Handbook," ". . . this treatment is not widely used, because of the cost and difficulty of plating and the danger of hydrogen embrittlement and subsequent cracking of the tools."

SUMMARY OF THE INVENTION

Thus, it is a primary object of this invention to provide improved, anti-wear, thin film coatings prepared by improved processes.

It is a further object of this invention to provide such coatings where tool life and rate of production are substantially improved.

It is a further object of this invention to provide such coatings which adhere well to the cutting edge of the tool and which are not quickly removed in vital areas.

It is a further object of this invention to provide such coatings which prevent significant build-up of the cut material on the tool and the accompanying rapid damage which usually occurs to the tool.

It is a further object of this invention to provide improved processes for applying such coatings whereby the tool is not damaged nor are its dimensions changed on a scale observable by normal shop techniques.

It is a further object of this invention to provide such improved coating processes which are simple and which can be made automatic so that the user can coat resharpened tools himself.

Other objects and advantages of this invention will become apparent upon reading the appended claims in conjunction with the following detailed description and the attached drawing.

DESCRIPTION OF THE PREFERRED EMBODIMENTS

The problems and difficulties of the prior art can be avoided and metal build-up prevented by the vacuum deposition of a thin coating of preferably titanium on a tool surface which is preferably cleaned and heated.

As will be brought out in more detail hereinafter, the tools should preferably be heated to a certain temperature range to promote diffusion of the vacuum deposited titanium into the cutting edge of the tool to thereby enhance the bonding of the coating to the cutting edge.

After the cleaning and heating steps, traces of certain impurities may remain on the heated tool surface such as oxides, nitrides, and carbides. The titanium apparently will react rapidly with these impurities, thus further enhancing the bond between the coating and the tool in that the titanium then can diffuse rapidly into the tool material a small distance. Because the coating process takes place in vacuum there is no deterioration of the tool material due to hydrogen embrittlement. Also, because the required temperatures are not extremely high, the tool material is not annealed or altered during the coating process.

The thickness of the coating may be about $10^{-2}$ to 10 $\mu$m and is preferably about 0.5 to 1 $\mu$m. Because the thickness of the titanium film is typically about 1 $\mu$m, the dimensions of a properly ground tool are not significantly altered by the coating. Furthermore, the process of vacuum deposition is so simple, fast and economical that titanium coatings can readily be applied even in low production shops.

Referring to the thickness of the coating, it should be noted that a cutting tool made of pure titanium would of course be totally useless. Even a pure titanium coating by itself, if thick, would be almost useless for titanium in bulk form is a relatively soft, sticky metal which tends to gall. However, the structure of the thin film used here is highly disordered on an atomic scale and has a microhardness much larger than the usual bulk value for titanium. Also, because the film is exceedingly thin, the mechanical properties of the composite structure are greatly influenced by the mechanical properties of the tool material. For example, the shearing stress the thin titanium coating can withstand when deposited on high speed tool steel is about ten times higher than the usual value for bulk titanium.

There is another important phenomenon which occurs in the normal operation of the titanium coated cutting tool in accordance with this invention which prevents the coating from galling and prevents metal build-up. Abrasion of the coating causes high localized temperatures at the surface of the coating thus causing rapid and continuous oxidation of the titanium coating. Because there is intimate contact between the surface of the metal being cut and the titanium coating only relatively small amounts of oxygen are available and thus $Ti_2O_3$ as well as $TiO_2$ is formed. It has been shown that $Ti_2O_3$ is extremely effective in preventing tool to chip welding on tungsten carbide cutting tools containing titanium carbide. See "Metals Engineering Quarterly," J. Stanislao and M. H. Rickman, 10,58 (1970). The more usual oxide, $TiO_2$ tends to spall off uselessly from a tool. It is believed that with the simple titanium coating of this invention the continuous formation of $Ti_2O_3$ prevents metal build-up on the cutting tool. It should be noted that in the tool field much effort has gone into the making of titanium carbide coatings on tungsten carbide tools. These coatings in themselves are very hard; however, as brought out above, the simple titanium coating of this invention acts as a good lubricant and is yet hard.

The improvements resulting from the use of simple titanium coatings in accordance with the invention may be judged either from a statistical analysis of relative lives of coated and uncoated tools, or simply by inspection of the tools themselves. For comparison with the uncoated and pitted edges shown in FIGS. 2 and 3, FIG. 4 is a photograph of a point of a titanium coated insert used in the same facing operation. The point of FIG. 2 did 27 parts, of FIG. 3, 15 parts, and coated insert shown in FIG. 4 made 79 parts. No pitting occurred in the insert of FIG. 4 although the edge has done several times as much work, and build-up is slight. Wear of a gradual sort caused discard of the insert of FIG. 4.

FIG. 6 is a photograph of the end of a titanium coated tap for comparison with the end of an uncoated tap shown in FIG. 5. Both taps made 387 tapped holes. Clearly the coating has decreased the damage.

From the foregoing it can be seen that the invention has particular applicability to cutting metal containing materials and, in particular, those which tend to build up on the cutting edge during a cutting operation. These materials tend to be those which form small, irregular bits of material when cut rather than well defined or continuous chips. Illustrative materials are steels and in particular unhardened steel and stainless steel, aluminum and its alloys, nickel and its alloys, and copper and its alloys.

In addition to titanium, elements suitable for antiwear coatings are zirconium, hafnium, and chromium. Alloys of these elements with each other also have desirable properties in terms of hardness, with unchanged wear characteristics. Further, these results are also obtained from alloys of other materials containing substantially these materials, or alloys which after heat treatment have a surface layer rich in these elements. An alloy content of at least 2 percent of Ti, Zr, Hf, or Cr is sufficient to show antiwear properties, while insuring bonding as described hereinbefore.

Figure 7:
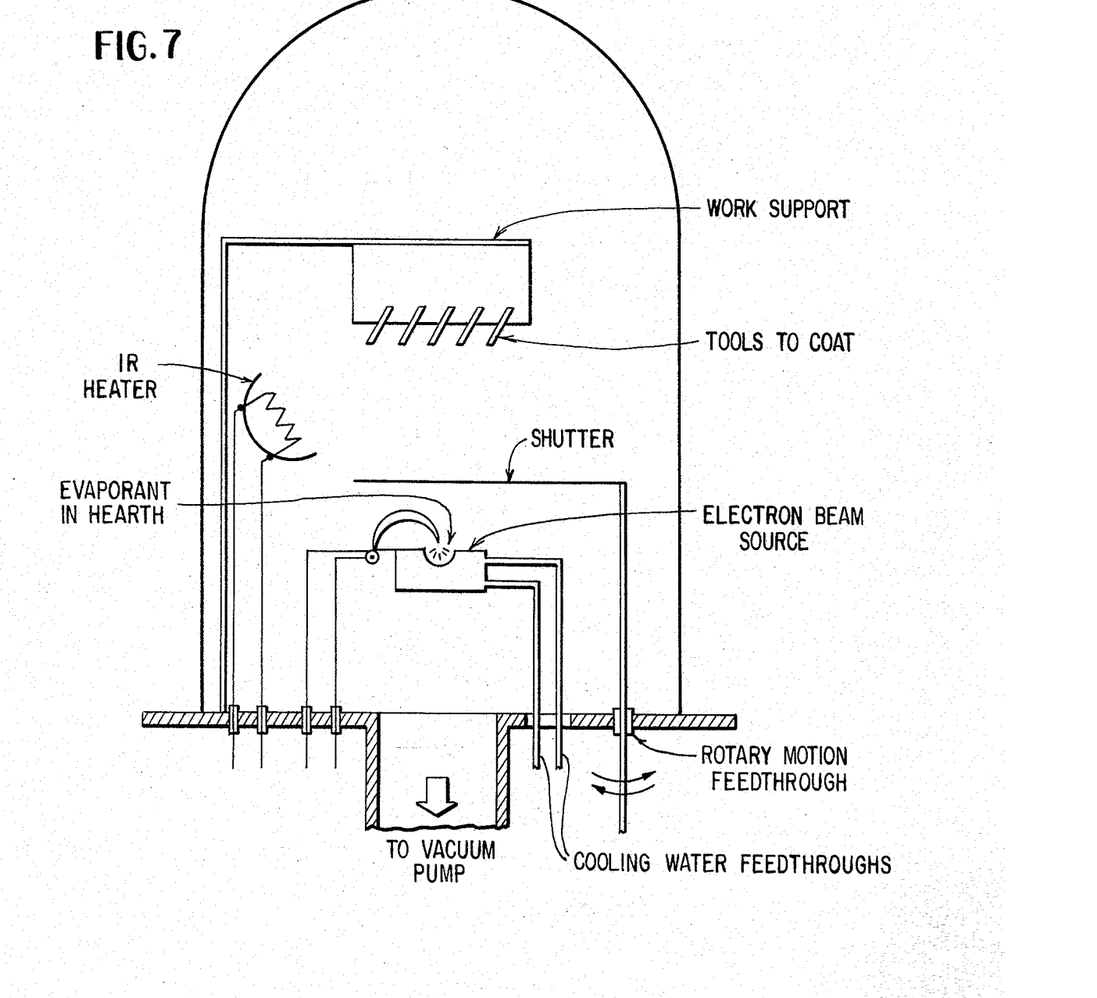
FIG. 7 is an illustrative, schematic representation of a working chamber of an evaporation system for use with this invention.

Methods for applying coatings of titanium and related elements in the periodic chart which have useful properties will now be described. First will be described a process for preparing coatings of Ti, Zr, Hf, and Cr by deposition in vacuum from a thermal source. In its most basic form this process consists of placing the items to be coated in a vacuum chamber with a source of vapor of the material to be deposited. The vacuum chamber must produce pressures low enough so that atomic collisions do not obstruct the trajectories of the vapor atoms, and so that the residual gas is not able to alter significantly the chemical nature of the vapor or the deposit. The latter condition is more important and requires that the partial pressure of chemically active gas be less than approximately $10^{-5}$ Torr. Since the vapor travels in straight lines, fixturing to hold the samples, and perhaps to rotate them to insure uniform coating, may be necessary. The construction of suitable vacuum systems and fixturing is well known to workers in the field. FIG. 7 represents a system of the type preferred.

The vapor is produced by heating a quantity of the material to be deposited until the rate of entry of material into the vapor phase is sufficient to allow deposition of the coating in a reasonable time. With typical source to substrate distances which range from a few centimeters to a few tens of centimeters this condition requires that the vapor pressure at the source be in the range of $10^{-4}$ to $10^{-3}$ Torr if fractional micron thick coatings are to be made in less than an hour. Even higher pressures could be used to allow rapid coating in large systems, perhaps in times of minutes. In some cases, particularly with Cr and Ti, significant vapor pressures are reached while the material is still in the solid state, making possible the use of a sublimation type of source. The materials to be used for these antifriction coatings are in general quite refractory metals, and high temperatures are required for rapid evaporation. The following table gives melting points (mp) and temperature vs. vapor pressure data in the useful range.

| Element | mp | $p=10^{-4}$Torr | $p=10^{-3}$Torr | $p=10^{-2}$Torr |
|---------|------|------|------|------|
| Ti | 1963°K | 1715°K | 1850°K | 2000°K |
| Zr | 2125 | 2275 | 2460 | 2670 |
| Hf | 2423 | 2275 | 2460 | 2690 |
| Cr | 2176 | 1435 | 1540 | 1665 |

Several well known types of sources exist which will provide an adequate supply of the vapor of these metals, or their alloys. The preferred source for the required high rates is an electron beam source such as the magnetically focused, 180° deflection type available from several manufacturers. For those elements which sublime, a strip of the metal heated by the passage of current can be used to obtain moderate deposition rates. Also best suited to the evaporation of moderate quantities of these elements, a conical basket of tungsten or similar wire loaded with pieces of the metal and heated by current constitutes a simple and low cost source.

Before the tools to be coated are inserted into the vacuum system they must be carefully freed of foreign material such as dirt, oil, or oxide films remaining from heat treatment. A suitable cleaning process includes the following steps: (1) removal of thick or loose oxides by abrasion; (2) removal of particulate contamination by ultrasonic cleaning in trichloroethylene, including a rinse; and (3) vapor degreasing. Alternate processess could use chemical removal of thick or loose oxides, and simple washing in solvents could replace the ultrasonic wash and degreasing. The details of suitable cleaning and pickling operations are given in "Handbook of Electron Tube and Vacuum Techniques" by Fred Rosebury (Addison-Wesley Publishing Co., Reading, Mass., 1965).

The final preparation of the samples takes place in the vacuum system just before coating. By heating the tools to a temperature of 200° to 400°C. in vacuum, depending upon the type of steel, for about 10 minutes, their surfaces are freed of much of the remaining traces of water and grease. The elevated temperature also promotes bonding of the deposit to the tool substrate. This temperature may be obtained by allowing the source to operate at reduced power input where no vapor is produced, but at which the radiation level produces heating, or by separate radiative or conductive heating means built into the fixturing.

Other pre-deposition treatments such as ion or electron bombardment can be used to clean the surfaces, but such elaborate means are not normally necessary.

A shutter should be provided between the source and substrate to allow control of the vapor stream. If, as the source is heated initially, the pressure rises above approximately $10^{-5}$ Torr, the shutter should be used to obstruct the flow. The first evaporant from a source is ordinarily not very pure, so in any case the use of a shutter is advisable.

The end of the deposition is determined by the presence of a coating of suitable thickness. In the simplest instance this may be determined by time and those source parameters which determine the deposition rate. This is accurate enough for a practical process, and thus preferred. Numerous means are available for determining the thickness of a coating during deposition, most by monitoring an adjacent substrate for its change of mass, optical density, or electrical resistance.

After the deposition has been concluded at the desired thickness, the still hot samples must be cooled sufficiently so that the opening of the system to air will not produce uncontrolled oxidation of the samples. Simply allowing the temperature to fall to about 50°C. is advisable. Since cooling in vacuum by radiation is slow and might require about one hour for tools, the use of an inert gas at a pressure of about one Torr speeds this step significantly.

Since the surface oxide is an important part of the coating it may be desirable to perform a controlled baking of the samples in air or oxygen at a temperature sufficient to oxidize the metal of the coating, but not high enough to anneal the substrate. This should be done by using a controlled substrate temperature and an $O_2$ pressure of about $10^{-3}$ to $10^{-1}$ Torr to oxidize the samples while still in the vacuum system, and thus reduce equipment needs and handling. The maximum allowable temperature for the tool substrate can be obtained from a table of properties of the alloy. See the before-mentioned "Metals Handbook," Vol 2, p. 221 ff. The formation of the oxide does, however, take place to a shallow depth automatically upon exposure to air for all of the suggested coating metals. The thickness of oxide formed will be self limiting at room temperature. In use as coatings on cutting tools, the temperature rise occasioned by friction will aid in forming further oxide, and the oxygen necessary would commonly be available from the air, or the coolant. These coatings would not be expected to perform effectively in an oxygen free environment unless they had been initially oxidized to an appreciable depth. Since most cases will not require a separate oxidation step in the processing, the preferred process will omit this step unless it is anticipated that the tool application will be under such conditions of limited oxygen access that a normal thin oxide film could not form.

In summary, suggested parameters for the coating operation are:

| | |
|---|---|
| substrate temperatures | |
| carbon steel | 200°C. |
| high speed steel | 400°C. |
| tungsten carbide | 1400°C. |
| vacuum conditions | partial pressure of active gas less than $10^{-5}$ Torr |
| deposition rate | 0.1 $\mu$m/hr to 1000 $\mu$m/hr |
| final thickness | $10^{-2}$ $\mu$m to 10 $\mu$m |
| intended operation | in air, with or without coolants |

In general, the substrate temperatures should be for steels 200° to 600°C. and preferably 200° to 400°C. while those for carbides should be 200° to 1700°C. and preferably 1300° to 1600°C. The lower temperature range for carbides is applicable whenever the carbide is bonded to another material in such a way that the combination cannot be exposed to higher temperatures.

Rather than effect vapor deposition of the coating material by thermal heating as has been previously described, deposition of these coatings may be obtained by sputtering. In evaporating or sublimating, the energy necessary to put an atom into the vapor phase is of thermal origin. In the sputtering, another process for obtaining a vapor of a material, the momentum of an energetic incident inert gas ion is in part transferred to an atom on the surface of the target, which frequently causes the escape of the target atom. There are frequently advantages in using sputtering over the process of evaporation discussed earlier. Some of the most important are:

1. It may not be possible to obtain a sufficient vapor pressure of the material at a reasonable temperature.

2. Sputtering can be used for many alloys where evaporation would produce a separation of the components.

3. Although bombardment of target and substrate by ions and electrons can cause considerable heating, the method can be said to use cool sources not subject to thermal deterioration.

4. The sputtering arrangement can be used in reverse polarity in the beginning, or at controlled intervals, to clean the substrate. Such cleaning is desirable to improve adhesion.

5. Sputtering ordinarily produces highly adherent films, partly because of the cleaning, but also because the arrival energy of the sputtered ions at the substrate is much greater than thermal energies.

Figure 8:
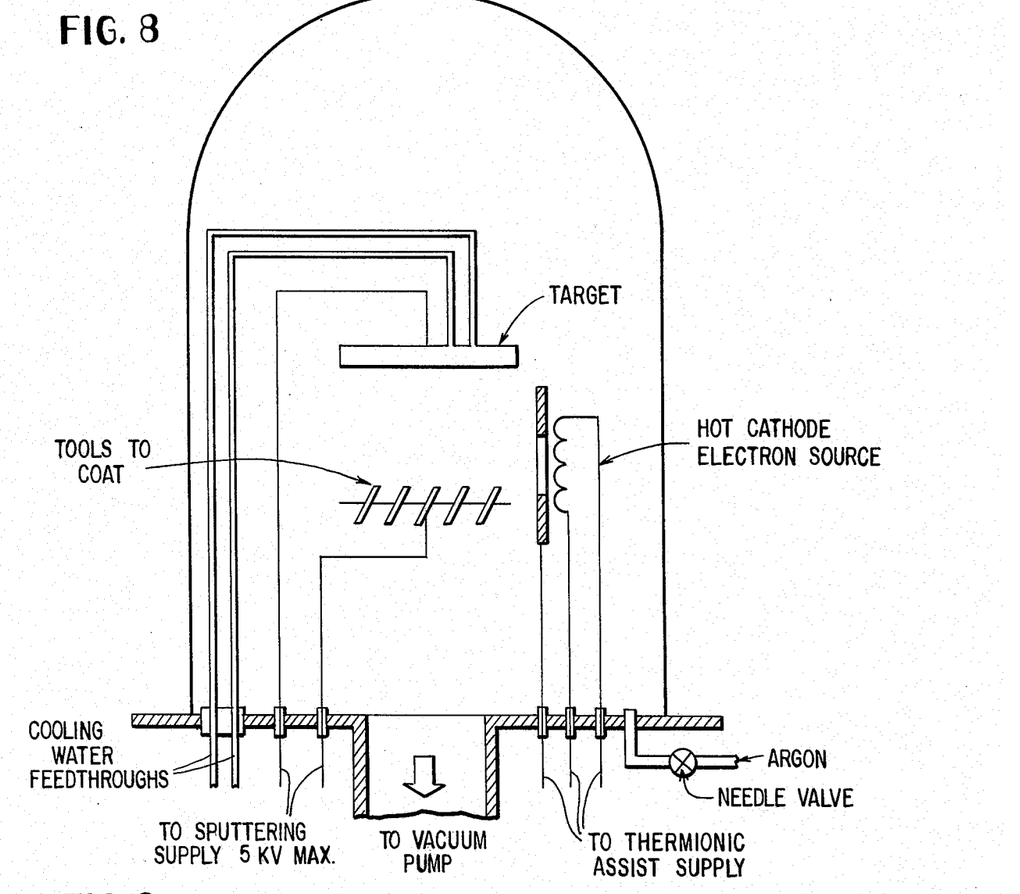
FIG. 8 is an illustrative, schematic representation of a working chamber of a sputtering system for use with this invention.

A sputtering system has the following basic components: (1) a vacuum system; (2) a working chamber; (3) a means of admitting gas at low pressure, usually argon gas when pure metal films are desired; (4) means of creating and maintaining a gas discharge or ion-electron plasma; and (5) means of controlling the substrate temperatures by heating or cooling. The sputtering arrangement known as "triode, hot cathode" is the preferred one for deposition of the metal films required for these antiwear coatings. Such a system is shown in FIG. 8 schematically. To understand the reasons for this choice, and to list alternatives, the following discussion is given of sputtering in general.

The vacuum system can be chosen from several standard types well known to workers in the field, and in fact may be very similar to the system needed for vacuum deposition. The basic difference is that the system for sputtering must operate effectively with a throughput of noble gas. Either diffusion pumps or turbo molecular pumps are effective. All types of ion pumps are not suitable. The gas may be admitted by a simple manually controlled leak valve, or by a feedback controlled valve acting to maintain a constant pressure. Temperature control may be attained for the tools by using either resistive heating, or water cooling, on the substrate holders as needed.

Most variations in sputtering systems come from the various possibilities of maintaining the discharge. The difference in the techniques influence such things as the attainable deposition rate, the purity of the deposits, and the cost of the apparatus. Since any of the common sputtering arrangements will produce acceptable coatings, the choice must be made on various practical considerations. Briefly, the acceptable systems are: (1) the simple diode arrangement with either dc, biased dc, or asymmetric ac power supply; (2) an arrangement similar to (1), but with the addition of a third electrode, a hot cathode; and (3) sputtering geometries and electrode arrangements as before, but with the use of rf power supplies.

In dc diode sputtering the material to be sputtered, called the target, must be electrically conducting. Another metal electrode, or the substrate (tool) to be coated is made the anode in a circuit with the target as the cathode. At gas pressures in the chamber of from $10^{-3}$ to $10^{-1}$ Torr a gas discharge will result if the applied voltage in this circuit is sufficient. Power supplies rated at a maximum of 5 kV output are standard for this application, with full voltage necessary at the lowest pressures, and only a fraction of this at the highest pressures. The target to anode spacing should be adjusted as a function of pressure. It may be taken as approximately equal to the width of the cathode dark space. This insures that ions colliding with the target will have sufficient energy to produce a high yield of sputtered target atoms. In this simple diode type of sputtering geometry the intensity of the discharge, and thus the sputtering rate, will be low at pressures below $10^{-2}$ Torr.

Relatively simple modifications of the power supply in diode sputtering will aid in improving the purity of the coatings, although the deposition rate will remain as slow as before. Contamination occurs in diode sputtering because of the presence of significant partial pressures of oils and other active gases along with the relatively high pressure inert gas. The long time required to deposit the film makes the presence of the contamination more important. If either the substrate is biased separately from the anode so that some ions strike it, or if the system is supplied with asymmetrically rectified ac so that a small amount of sputtering occurs from the substrates, then cleaner deposits will result.

It is preferable to lower the pressure, and at the same time to increase the sputtering rate to values in the range of $2 \times 10^{-3}$ to $10^{-2}$ $\mu$m/min. This can be done by locating a hot cathode electron source in the neighborhood of the anode and biasing it in such a way that there is a current of electrons from cathode to anode. Since the electron (ionizing) current can be large, this requires a separate lower voltage supply. The electron current from the hot cathode creates many ions which allow the discharge to be maintained to lower pressures at high intensity. The intensity of the discharge may be controlled by adjusting the cathode temperature.

The addition of a radio frequency high voltage to the voltage supplied to the target-anode system, often with the dc as before, will also allow a sputtering system to operate to lower pressures. The rf may also be applied to a coil surrounding the discharge region to increase the ion density in the target region.

Although all of the above sputtering arrangements could produce the desired anti-friction coatings on tools, the triode hot cathode arrangement is preferable from the standpoint of simplicity, sputtering rates, and cleanliness.

In the case of sputtering there is no significant difference whether the coatings are to be put on tungsten carbide, high speed steel, or other metal substrates. The substrate temperatures must simply be controlled to remain below the values cited previously.

The oxidation might conveniently be done by reducing the substrate temperatures after the deposition, admitting oxygen to give a partial pressure of $O_2$ of about $10^{-3}$ Torr, the remaining gas being argon. Operation of the discharge will cause surface oxidation of the coatings. As in the case of the evaporated samples such oxidation before use is not usually necessary.

Figure 9:
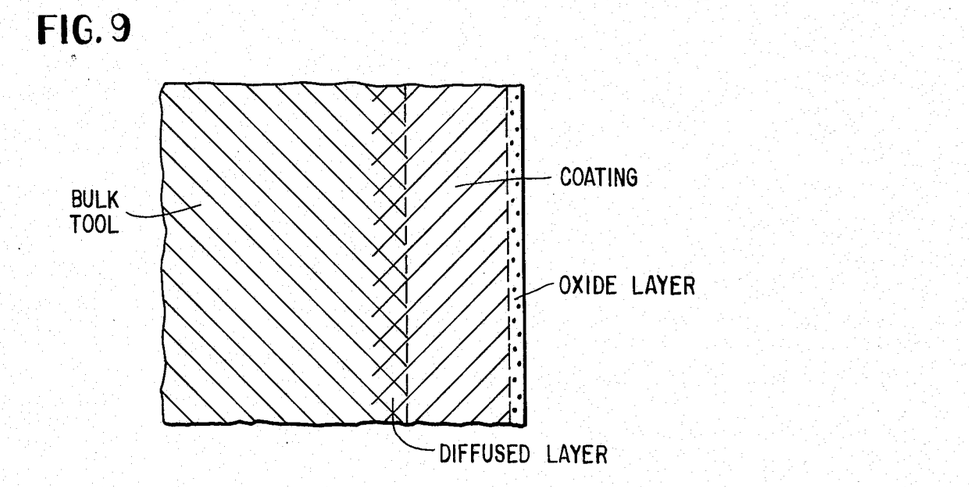
FIG. 9 is an illustrative embodiment of a composite structure of a tool and its coating in accordance with this invention.

FIG. 9 shows an illustrative embodiment of a structure obtained in accordance with this invention. The substrate is ordinarily a normal cutting tool, with standard dimensions and heat treatment. The thickness of the coating is so small (typically about 1 $\mu$m or $4 \times 10^{-5}$ inch) that the effect of the coating thickness is not observable to normal machine tolerances. The metal containing tool can include, for example, a variety of tool steels, tungsten carbides, or cemented carbide mixtures as are commonly used. See, for example, "Hartmetalle" by R. Kieffer and F. Benesofsky (Springer-Verlag, Vienna, 1965).

Between the base or substrate material of the tool and the coating there is a region where the tool metal and coating are intermingled. The ability to react with residual impurities such as oxides, nitrides, or carbides, as has been described hereinbefore, and thereby directly reach the metal surface and diffuse into it is one of the desirable properties of titanium and similar metals. This is useful since it further increases the adhesion of the films. It is aided by using the deposition temperatures previously suggested as maximum since the elevated temperatures aid in removing contamination, allowing the coating material and substrate to come into contact. Also, interdiffusion is promoted by high temperatures. The maximum useable temperature is determined by the tool, since its properties must remain unchanged. Should a partial monolayer of foreign material, as of oxygen or carbon be present, this will not have a significant effect upon the results. The next layer is the coating which should have a preferred thickness of 0.5 to 1 $\mu$m. As stated hereinbefore, thicknesses from $10^{-2}$ to about 10 $\mu$m also produce the desired antifrication coatings. If abrasive materials are present, the thicker coatings are desirable.

In accordance with the discussion given earlier about the mechanism whereby these coatings protect the tool and prevent breakdown, the surface oxide layer shown outermost in FIG. 9 is an important part of the arrangement. The thickness of the oxide layer can extend to include the entire coating thickness as a maximum. It is this film that prevents metal to metal contact. This film of oxide can be formed by a processing step as was discussed earlier, but this step is not usually necessary. When the tool is in use, friction raises the temperature sufficiently to enable the oxide to form quickly from the ambient. In addition, the metals are active enough so that a layer of approximately $10^{-2}$ $\mu$m thickness will form after exposure to air at room temperature for a few days.

Numerous modifications of the invention will become apparent to one of ordinary skill in the art upon reading the foregoing disclosure. During such a reading it will be evident that this invention provides a unique, antiwear, thin film coating for tools and a method for making same for accomplishing the objects and advantages hereinstated.

What is claimed is:

1. A method for cutting with a tool a metal containing material tending to build up on the cutting edge of said tool during a cutting operation comprising cutting said material with a tool having (a) a cutting edge substrate for said tool for cutting metallic materials; and (b) a physically vapor deposited coating of a material selected from the group consisting of titanium, chromium, hafnium, zirconium, and alloys thereof with each other, the thickness of said coating being approximately in the range of $10^{-2}$ to 10 $\mu$m, said coating being partially diffused in said substrate to form a bond therebetween so that build up of said metal containing material on said cutting edge is minimized during said cutting step.

2. A method as in claim 1 where said metal containing material is selected from the group consisting of steel, aluminum and its alloys, nickel and its alloys, and copper and its alloys.

3. A method as in claim 2 where said steel is selected from the group consisting of stainless steel and unhardened steel.

4. A method as in claim 1 where said thickness of said coating is approximately in the range of 0.5 to 1 $\mu$m.

5. A method as in claim 1 where said cutting edge substrate is selected from the group of materials consisting of steel, tungsten carbide, and cemented carbide mixtures.

6. A method as in claim 1 where said coating material is titanium.

7. In a tool for cutting with a tool metallic materials tending to build up on the cutting edge of said tool during a cutting operation, the improvement comprising
a. a cutting edge substrate;
b. a physically vapor deposited coating of a material selected from the group consisting of titanium, chromium, hafnium, zirconium, and alloys thereof with each other, the thickness of said coating being approximately in the range of $10^{-2}$ to 10 $\mu$m, said coating being partially diffused in said substrate to form a bond therebetween so that build up of said metallic materials on said metal containing material on said tool is minimized during said cutting.

8. The improvement as in claim 7 where said thickness of said coating is approximately in the range of 0.5 to 1 $\mu$m.

9. The improvement as in claim 7 where said cutting edge substrate is selected from the group of materials consisting of steel, tungsten carbide, and cemented carbide mixtures.

10. The improvement as in claim 7 where said coating material is titanium.

11. A method as in claim 1 where said coating is physically vapor deposited by sputtering.

12. A method as in claim 1 where said coating is physically vapor deposited by thermal heating.

13. In a tool in claim 7 where said coating is physically vapor deposited by sputtering.

14. In a tool as in claim 7 where said coating is physically vapor deposited by thermal heating.

* * * * *